(12) United States Patent
Azzam et al.

(10) Patent No.: US 7,668,791 B2
(45) Date of Patent: Feb. 23, 2010

(54) DISTINGUISHING FACTS FROM OPINIONS USING A MULTI-STAGE APPROACH

(75) Inventors: Saliha Azzam, Redmond, WA (US); Kevin William Humphreys, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/496,650

(22) Filed: Jul. 31, 2006

(65) Prior Publication Data

US 2008/0027888 A1   Jan. 31, 2008

(51) Int. Cl.
    *G06N 5/00* (2006.01)
(52) U.S. Cl. .................... 706/45; 704/235; 715/513
(58) Field of Classification Search .............. 706/25, 706/12, 14, 45, 47; 707/3, 6; 709/220
See application file for complete search history.

(56) References Cited

U.S. PATENT DOCUMENTS

| | | | |
|---|---|---|---|
| 5,331,556 A | 7/1994 | Black, Jr. et al. | |
| 5,519,608 A | 5/1996 | Kupiec | |
| 5,696,962 A | 12/1997 | Kupiec | |
| 6,167,370 A | 12/2000 | Tsourikov et al. | |
| 6,609,091 B1 | 8/2003 | Budzinski | |
| 6,665,661 B1 | 12/2003 | Crow et al. | |
| 6,741,986 B2 | 5/2004 | Cho et al. | |
| 7,254,530 B2 | 8/2007 | Klavans et al. | |
| 7,376,551 B2 | 5/2008 | Powell et al. | |
| 2004/0158469 A1 | 8/2004 | Brand | |
| 2004/0163035 A1 | 8/2004 | Ariel et al. | |
| 2004/0172378 A1* | 9/2004 | Shanahan et al. | .............. 707/1 |
| 2005/0108630 A1* | 5/2005 | Wasson et al. | .............. 715/513 |
| 2005/0192992 A1 | 9/2005 | Reed et al. | |
| 2005/0267871 A1 | 12/2005 | Marchisio et al. | |
| 2006/0041424 A1 | 2/2006 | Todhunter et al. | |
| 2006/0095250 A1* | 5/2006 | Chen et al. | .............. 704/9 |
| 2007/0027860 A1* | 2/2007 | Bestgen et al. | .............. 707/5 |

OTHER PUBLICATIONS

International Search Report received from the Korean Intellectual Property Office regarding International Application No. PCT/US2007/016435 dated Dec. 3, 2007, 7 pages.

(Continued)

*Primary Examiner*—David R Vincent
*Assistant Examiner*—Kalpana Bharadwaj

(57) ABSTRACT

Facts are extracted from electronic documents by recognizing factual descriptions using a fact-word table to match to words of the electronic documents. The words of those factual descriptions may be tagged with the appropriate part of speech. More detailed analysis is then performed on those factual descriptions, rather than on the entire electronic document, and particularly to the text in the neighborhood of the fact-word matches. The analysis may involve identifying the linguistic constituents of each phrase and determining the role as either subject or object. Exclusion rules may be applied to eliminate those phrases unlikely to be part of facts, the exclusion rules being based in part on the linguistic constituents. Scoring rules may be applied to remaining phrases, and for those phrases having a score in excess of a threshold, the corresponding sentence part, whole sentence, paragraph, or other document portion may be presented as representing one or more facts.

20 Claims, 4 Drawing Sheets

OTHER PUBLICATIONS

Pasca et al., "Organizing and Searching the World Wide Web of Facts - Step One: the One-Million Fact Extraction Challenge", Proceedings of the Twenty-First National Conference on Artificial Intelligence, Jul. 16-20 2006, Published by the AAAI Press, pp. 1400-1405.

Pasca et al., "Names and Similarities on the Web: Fact Extraction in the Fast Lane", Proceeding of the 21st International Conference on Computational Linguistics and 44th Annual Meeting of the ACL, Sydney, Jul. 17-21 2006, pp. 809-816.

Neumann et al., "A shallow text processing core engine", Abstract, Computational Intelligence, vol. 18, No. 3, Aug. 2002, available at http://md1.csa.com/partners/viewrecord.php?requester=gs&collection=TRD&recid=200304650062CI.

Leskovec et al., "Impact of Linguistic Analysis on the Semantic Graph Coverage and Learning of Document Extracts", Proceedings of the 12th National Conference on Artificial Intelligence, Published by AAAI 2005.

Basil et al., "A 'not-so-shallow' parser for collocational analysis", Proceedings of the 15th Conference on Computational Linguistics, Kyoto, Japan, Aug. 5-9, 1994.

Anderson et al., "Automatic Extraction of Facts from Press Releases to Generate News Stories", Proceedings of the Third Conference on Applied Natural Language Processing, Trento, Italy, Mar. 31-Apr. 3, 1992.

* cited by examiner

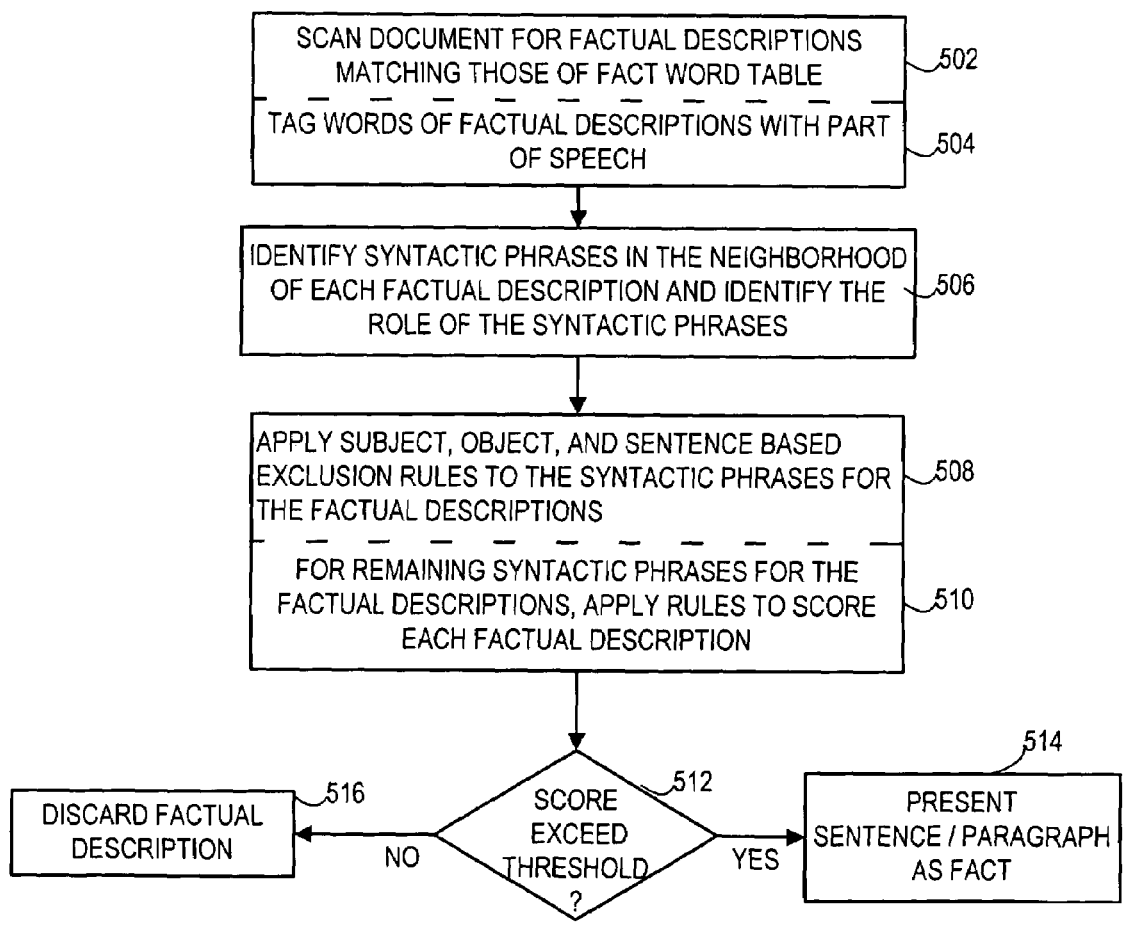

US 7,668,791 B2

DISTINGUISHING FACTS FROM OPINIONS USING A MULTI-STAGE APPROACH

BACKGROUND

Electronic documents may contain a mixture of facts and opinions. At times, a reader may only be interested in facts, or may wish to have the facts be identified. For example, a user performing an on-line search for information may wish to obtain facts about a particular subject as quickly and efficiently as possible. However, presenting a list of web pages or other electronic documents that are related to the search terms used require the user to individually examine each web page or other electronic document and distinguish the facts from the opinions or subjective information.

Attempts have been made to perform fact extraction. However, accurate fact extraction can be a slow and inefficient process even for high-speed server computers. Such fact extraction attempts generally apply a linguistic analysis to the entire contents of the electronic document to extract those facts that it may contain. When applying fact extraction to hundreds or thousands of electronic documents, the amount of time needed to achieve a result may be unacceptable.

SUMMARY

Embodiments provide optimization of fact extraction by using a multi-stage approach. The electronic documents are scanned to find factual descriptions that are likely to contain facts by using a fact-word table to match terms within sentences of the electronic documents to obtain a set of factual descriptions. Further analysis may then be performed, including determining linguistic constituents, e.g., syntactic constituents and/or semantics, in the neighborhood of that set of factual descriptions rather than on the entire document. Accordingly, time is saved by avoiding a complex lexical and syntactic analysis of the entire document for every electronic document of interest.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 4 shows an example of an operational flow of the multiple steps of fact extraction.

FIG. 5 shows an example of a more detailed operational flow of the multiple steps of fact extraction.

DETAILED DESCRIPTION

Embodiments provide for fact extraction using multiple stages to avoid performing complex analyses of the entire documents of interest. Factual descriptions of the documents are recognized in relation to a fact-word table in an initial stage. These factual descriptions may be tagged with their parts of speech, either noun or verb. Then more detailed analyses may be done in a subsequent stage over those factual descriptions to thereby avoid such detailed analyses over the entire documents of interest. The linguistic constituents for each factual description may be determined and then exclusions and scores may be used to eliminate factual descriptions that are less likely to be facts. The factual descriptions remaining after the exclusions and scoring may then be presented as fact.

Figure 1:
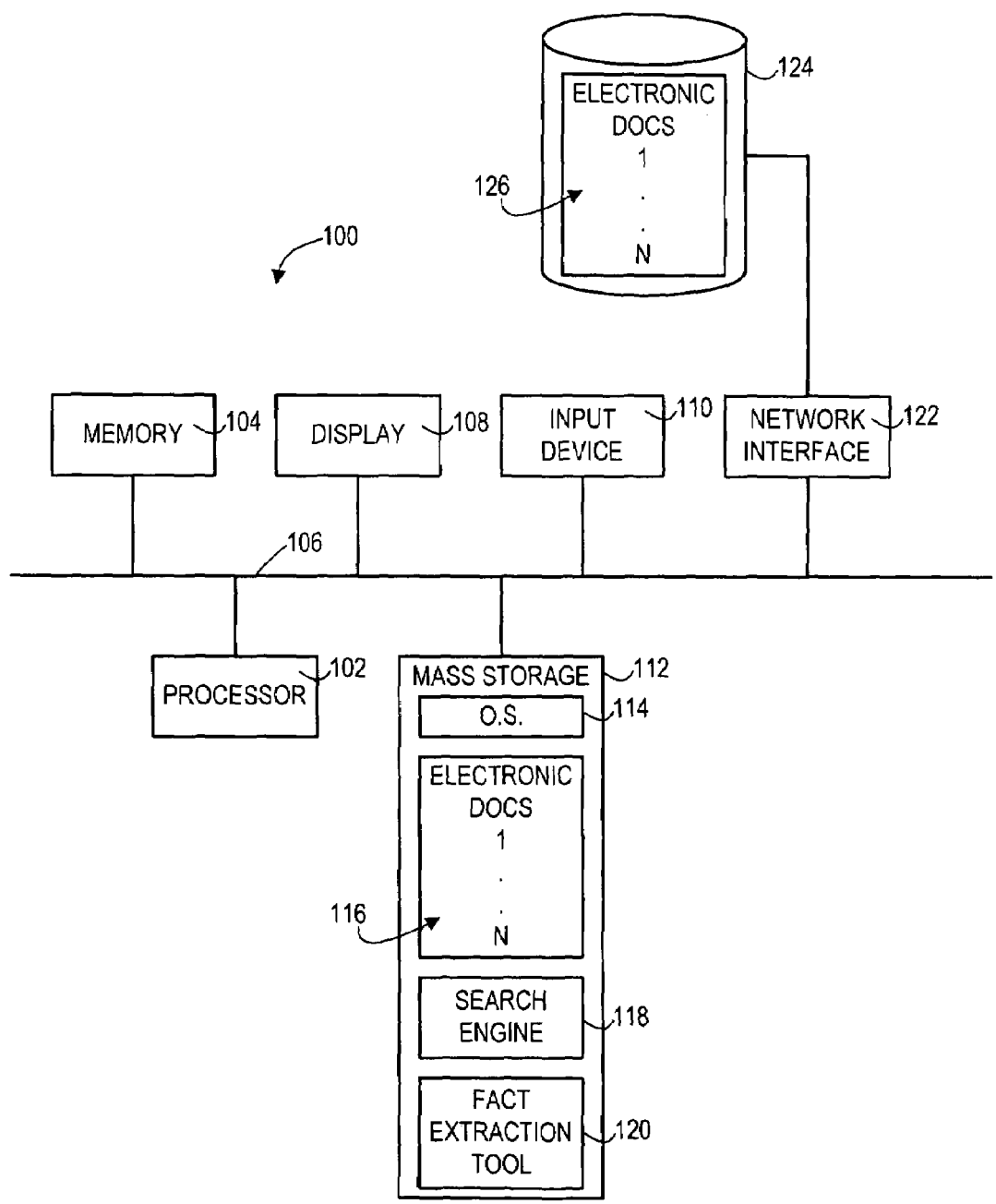
FIG. 1 shows an example of a computer system for implementing embodiments.

FIG. 1 shows an example of a computer system 100 that provides an operating environment for the embodiments. The computer system 100 as shown may be a standard, general-purpose programmable computer system 100 including a processor 102 as well as various components including mass storage 112, memory 104, a display adapter 108, and one or more input devices 110 such as a keyboard, keypad, mouse, and the like. The processor 102 communicates with each of the components through a data signaling bus 106. The computer system 100 may also include a network interface 124, such as a wired or wireless connection, that allows the computer system 100 to communicate with other computer systems via data networks. The computer system 100 may alternatively be a hard-wired, application specific device that implements one or more of the embodiments.

In the example, of FIG. 1, the processor 102 implements instructions stored in the mass storage 112 in the form of an operating system 114. The operating system 114 of this example provides a foundation upon which various applications may be implemented to utilize the components of the computer system 100. The computer system 100 may implement a search engine 118 or similar application for finding electronic documents relevant to a particular situation. For example, the search engine 118 may receive search terms entered directly through input device 110 by a user of the computer system 100 or may receive search terms submitted by a user of a remote computer that are received via the network interface 122.

The search and/or fact extraction may occur in relation to one or more sets of electronic documents that contain textual information such as web pages, standard word processing documents, spreadsheets, and so forth. These electronic documents may be stored locally as electronic document set 116. These electronic documents may also be stored at a non-local location such as network-based storage 124 containing an electronic document set 126. Network-based storage 124 is representative of local network storage, on-line storage locations of the Internet, and so forth. The network-based storage 124 is accessible via the network interface 122.

Additionally, these embodiments provide logic for implementation by the processor 102 in order to extract the facts from the electronic documents 116, 126. A fact extraction tool 120 may be present on the local storage device 112, either as a component of the operating system 114, a component of the search engine 118 or other application, or as a stand-alone application capable of producing its own independent results. The logical operations performed by embodiments of the fact extraction tool 120 are discussed below in relation to FIGS. 2-5.

The computer system 100 of FIG. 1 may include a variety of computer readable media. Such computer readable media contains the instructions for operation of the computer system and for implementation of the embodiments discussed herein. Computer readable media can be any available media that can be accessed by computer 100 and includes both volatile and nonvolatile media, removable and non-removable media. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2:
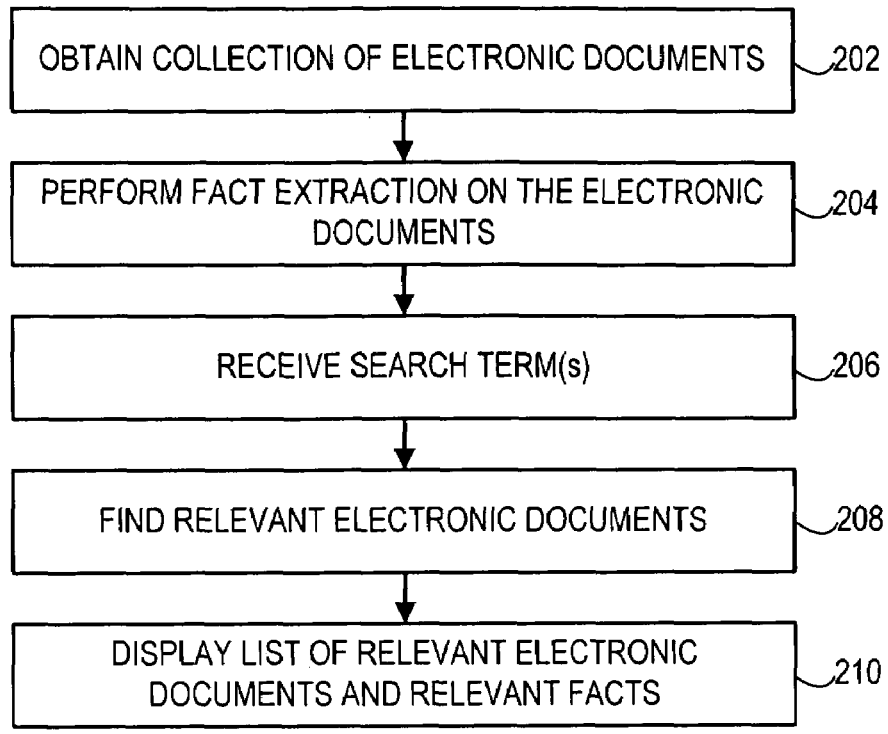
FIG. 2 shows an example of an operational flow of a search involving the presentation of facts that have been extracted prior to the search.

FIG. 2 shows an example of logical operations performed by a search engine 118 in conjunction with the fact extraction tool 120. In this example, the fact extraction tool 120 is utilized prior to a search occurring in order to generate a library of facts present in the electronic documents to be searched. In this manner, there is no processing time required to extract the facts but instead those facts have already been extracted and are retrieved from a fact library on the basis of the search terms entered.

The logical operations begin at collection operation 202 where the collection of electronic documents is obtained or access is otherwise achieved. For example, the electronic documents to eventually be searched may be saved to local storage or may be acquired via on-line access. The fact extraction tool 120 then operates upon each one of those electronic documents to attempt to extract all of the facts that are present in the electronic documents. The fact extraction tool 120 may generate a library of facts that are stored in association with the corresponding electronic documents and are available for access during future searches. For example, Table 1 shows such a library of associations.

TABLE 1

| Electronic Document | Facts |
|---|---|
| www.sample1.com | Fact A |
|  | Fact B |
|  | Fact C |
| www.sample2.com | Fact AA |
|  | Fact BB |
|  | Fact CC |
| www.sample3.com | Fact AAA |

Continuing with the operational flow of FIG. 2, a user wishing to do a search to find relevant electronic documents, and particularly to find relevant facts from those electronic documents, enters a search term into the search engine 118 at term operation 206. In this example, the search engine 118 then searches through the electronic documents for the search terms and finds matching documents at document operation 208. The search engine also finds the previously extracted facts which match the search terms from those matching electronic documents and then displays the relevant documents or a link thereto along with the relevant facts at display operation 210. For example, a search term may be found in www.sample1.com and the search term may also be found to match Fact A and Fact B such that a link to www.sample1.com is displayed along with Fact A and Fact B. Thus, the user is quickly provided with facts related to the search terms that were entered. An example of such a screen display is discussed below in relation to FIG. 6.

Of course, as an alternative the search may be for previously extracted facts only, rather than for the electronic documents themselves. Furthermore, in certain circumstances the previously extracted facts may match the search terms regardless of whether the electronic documents containing the facts match the search terms.

Figure 3:
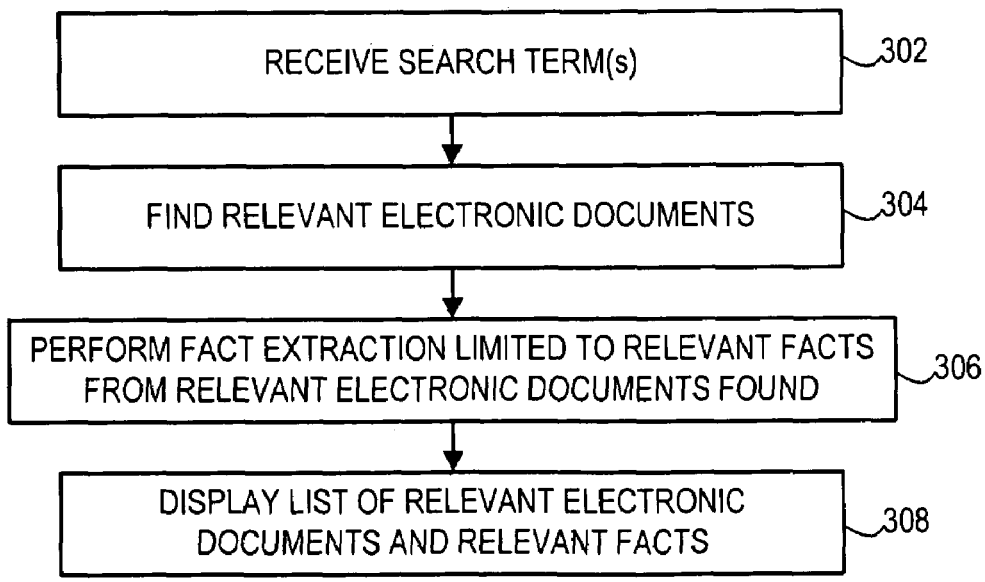
FIG. 3 shows an example of an operational flow of a search involving the presentation of facts that have been extracted during the search.

FIG. 3 shows another example of logical operations performed by a search engine 118 in conjunction with the fact extraction tool 120. In this example, the fact extraction tool 120 is utilized during a search in order to discover facts present in the electronic documents as they are being found by the search. In this manner, there is no need for pre-search fact extraction and no need for storage of a library of facts. In such a scenario, the fact extraction tool may only scan snippets or summaries of the document to provide very fast results, or the entire document may also be scanned to extract all potential facts.

The logical operations begin at term operation 302 where a user enters a search term into the search engine 118. In this example, the search engine 118 then searches through the electronic documents for the search terms and finds matching documents at document operation 304. The extraction tool 120 is then employed at extraction operation 306 in order to analyze the electronic documents that have been found by the search in order to extract facts from those documents that are relevant to the search terms. The result of extraction operation 306 may produce a temporary set of associations between electronic documents and facts as shown in Table 1, which may then be placed in longer term storage in anticipation searches for those search terms occurring in the future. The search engine then displays the relevant documents or a link thereto along with the relevant facts returned by the fact extraction tool 120 at extraction operation 306 at display operation 308.

FIG. 4 shows the multi-stage approach utilized by embodiments of the fact extraction tool 120. Initially, the fact extraction tool 120 attempts to recognize a set of factual descriptions from the electronic documents of interest at recognition operation 402. Here, the goal is to find those descriptions in the text that are likely to be facts based on finding matches to a fact-word table discussed in more detail below with reference to FIG. 5. By performing a quick matching process, much of the electronic document that should be ignored when finding facts can be eliminated from further fact extraction processing thereby increasing the efficiency of the subsequent stage(s) that are employed to increase accuracy.

After having identified a set of factual descriptions for a document being analyzed, fact extraction is then performed on that set of factual descriptions at extraction operation 404. Here, more detailed analyses are performed only on the set of factual descriptions, as opposed to the whole document, so that satisfactory efficiency is maintained while adequate accuracy is achieved. The analyses of extraction operation involve decision making based on a determination of linguistic constituents of the factual descriptions. Such linguistic constituents may include the syntactic constituents, the semantics, and so forth.

FIG. 5 shows an example of details of the recognition and extraction operations of FIG. 4. The logical operations begin at scanning operation 502 where the fact extraction tool 120 scans the electronic document to find words or phrases matching those of a fact-word table. A fact-word table is a list of words or phrases that are known to likely be used when expressing a fact as opposed to an opinion for example. Table 2 shows a brief example. Note that to provide optimal processing performance, the words of the table may be associated with the most appropriate part of speech (POS) tag which is discussed below in relation to tag operation 504.

TABLE 2

| Fact-Word List | POS Tags |
|---|---|
| Word/Phrase 1 | POS Tag |
| Word/Phrase 2 | POS Tag |
| Word/Phrase N | POS Tag |

Research has been done to determine words that are suggestive of facts rather than opinions. For example, the class of words that introduce facts can be derived using research and work on the classification of verbs and their lexical functions. Two relevant papers that may be used as a material to do so include:

(1) Mel'cuk (1996) Lexical Functions: A Tool for the Description of Lexical Relations in the Lexicon. In L. Wanner (ed.): *Lexical Functions in Lexicography and Natural Language Processing*, Amsterdam/Philadelphia: Benjamins, 37-102.

(2) Fontenelle, T. (1997): "Discovering Significant Lexical Functions in Dictionary Entries", in Cowie, A P. (ed.) *Phraseology: Theory, Analysis, and Applications*, Oxford University Press, Oxford.

Thus, on the basis of such research, the fact-word list as shown in Table 2 may be constructed to include those verbs or other words that are suggestive of a fact expression as opposed to a non-fact. For example, the terms "invented" or "hired" are suggestive of a fact expression whereas the terms "can be" or "complains" are not. A particular example of a fact-word list can be found in Appendix A located at the end of this specification. This particular example is a non-exhaustive list of verbs that are fact-words that may be used to discover factual descriptions in electronic documents.

Either upon application of the fact-word table to an electronic document, or in parallel with the application of the fact-word table such as where the POS Tag is already associated with the words in the fact-word table, the parts of speech (POS) of each of the words of each factual description are tagged at tag operation 504. This tagging operation 504, which may occur in parallel with or subsequent to scan operation 502, may involve making disambiguating choices for words which have more than one POS tag, such as by favoring a noun tag over a verb tag since it is understood that syntactic phrases like noun phrases are known to be the entities involved in a factual event. Any unknown and non-pre-tagged words may default to nouns for this reason as well. As with nouns, adjectives may be favored over verbs (e.g., "planned" as an adjective over "planned" as a verb) as well such that words having both an adjective and verb tag will default to adjective because adjective are part of noun phrases which are known to be the entities involved in a factual event. When creating the associations of the POS Tags to the words of the fact-word table, such as when creating the table, these disambiguating choices may already be applied so that, for instance, "planned" is associated with an adjective POS Tag in the table and not a verb POS Tag.

Once the factual descriptions have been found and the words of the factual descriptions have been tagged with the POS, then the more complete analysis may be performed to improve the accuracy of the fact extraction without requiring that the entire document be subjected to this more complete processing. At identification operation 506, syntactic phrases like noun phrases and verb phrases are identified. The syntactic phrases are identified by utilizing conventional grammar rules and light linguistic analysis. Those syntactic phrases that are in the neighborhood, i.e., very local to the set of factual descriptions in a document are identified and if a factual description has no syntactic phrases associated to it, then the corresponding sentence may be eliminated from further consideration. Thus, by focusing on only those syntactic phrases that are in the neighborhood of the factual description, the process avoids looking at all the linguistic constituents of a whole sentence.

Furthermore, at identification operation 506, the linguistic constituents of the factual descriptions having the neighboring syntactic phrases are further determined by assessing the role a syntactic phrase plays within the corresponding sentence based on the pattern identified in the factual description. Thus, it is determined from the word pattern of the factual description whether the syntactic phrase plays the role of subject or object within the sentence containing the current factual description being analyzed.

Once the linguistic constituents of the factual descriptions are determined, i.e., the syntactic phrases and their roles have been identified, exclusion rules may then be applied to those noun phrases of the factual descriptions to further eliminate those that are less likely to be an expression of fact at exclusion operation 508. The exclusion rules may be applicable on the basis of a syntactic phrase as an object, a syntactic phrase as a subject, or a syntactic phrase without regard to its role. Furthermore, in this particular embodiment, an exclusion rule being applied to individual words, to the syntactic phrases, or to the whole sentence lead to the same result, which is to exclude the whole sentence from being a factual description. An example of exclusion rules that may be applied is shown in Table 3.

TABLE 3

| Exclusion Rules | Conclusion |
|---|---|
| "Object" has "opinion/biased" modifier | Rule out the sentence candidate |
| Sentence Filters:<br>Initial word of sentence (e.g., pronouns)<br>Punctuation: e.g. '?' | Rule out the sentence candidate |
| "Subject" is a definite - unless Proper name | Rule out the sentence candidate |
| Surrounding "Context" of the "Object" | Rule out the sentence candidate if the surrounding context has a particular POS that is not indicative of a fact (e.g., some class of pronouns) |
| Stop words occur in the sentence | Rule out the sentence candidate |
| "Subject" of "Object" contain pronouns | Rule out Noun Phrase |

Either upon application of the exclusion rules, or in parallel with the application of the exclusion rules, scoring rules are applied at scoring operation 510. The scoring rules give a weight to both the subject and object noun phrases for each of various features, and a total score for the candidate factual description is the sum of the individual feature weights plus the certainty score of the matching fact-word. The individual feature weights may be positive, when indicative of a fact, and may be negative, when indicative of a non-fact. Examples of features and associated scoring rules are provided below in Table 4. The feature scores may be manually assigned using human judgment or may be automatically learned.

TABLE 4

| Features | Scoring rules |
| --- | --- |
| Certainty score of the matching pattern (fact-word, e.g., main verb) | |
| Class of the Roles (i.e., subject or verb), e.g.: person, country, organization, etc. | Score per class |
| Main "subject" contains a Proper Name | Normal weight |
| "Object" length | Length score |
| "Subject" length | Length score |
| Sentence length | Length score |
| "Subject" appears at beginning of sentence - i.e., subject offset | Position score |
| "Object" has a modifier (adjective, adverbs) | Negative - Basic weight |
| "Object" is a definite ("the") | Negative - Basic Exclusive when ends copula sentence |

The total score for the factual description is then compared to a pre-defined threshold to determine whether the total score exceeds the threshold at query operation 512. If the threshold is not exceeded, then the corresponding factual description may be discarded. If the threshold is exceeded, then the factual description, the complete sentence, and/or the complete paragraph or other document portion may be presented as a fact at presentation operation 514. This presentation may include displaying the fact, saving the fact to a library, and so forth.

In utilizing the scoring rules and threshold comparison, the weights assigned to the features and/or the threshold value may be manipulated without manipulating the whole approach to fact extraction. In this manner, the degree of accuracy of fact extraction and presentation can be controlled while the processing steps remain the same.

Figure 6:
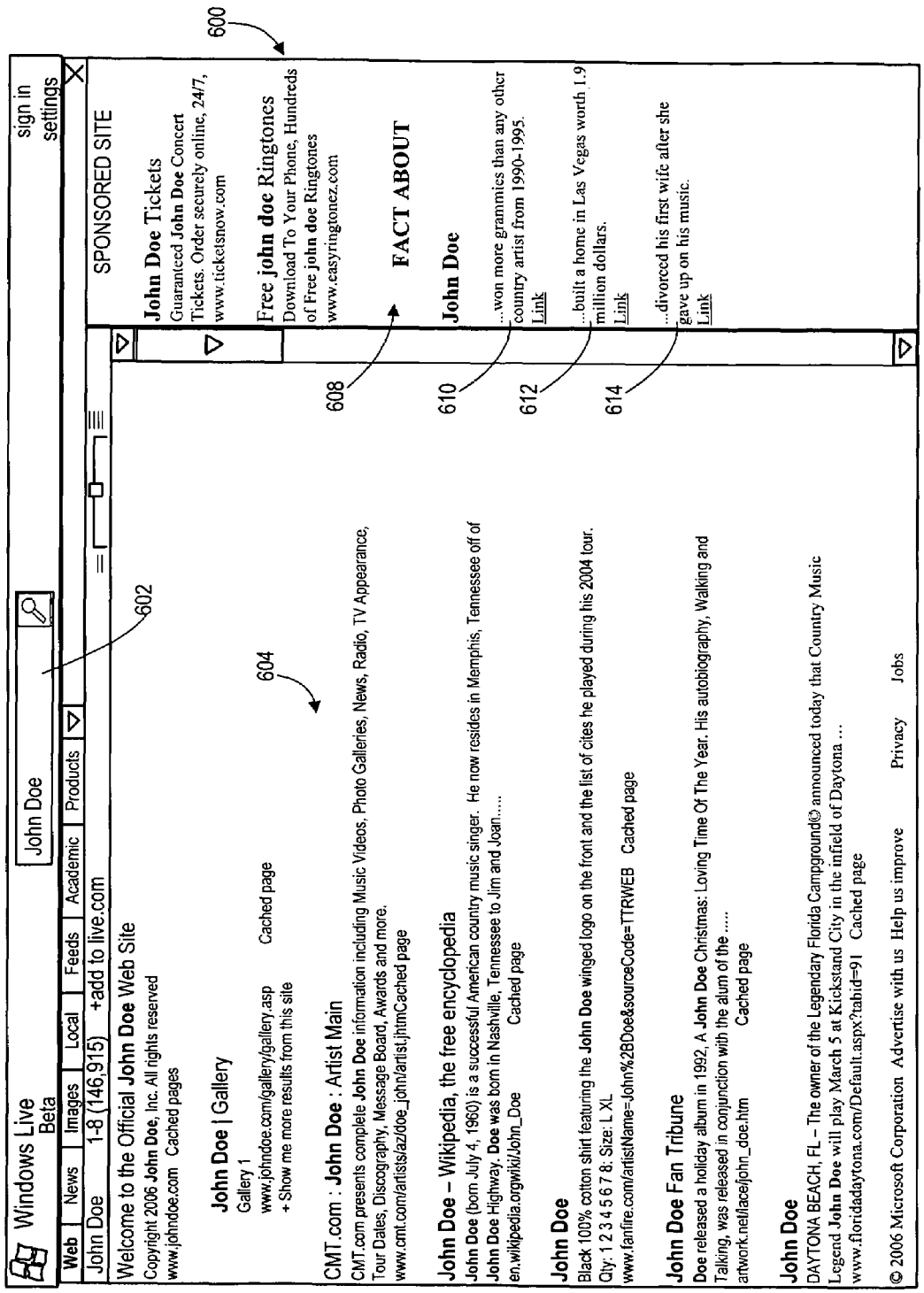
FIG. 6 shows an example of a screen display providing search results that include the presentation of facts obtained from electronic documents discovered by the search.

FIG. 6 shows an example screenshot 600 resulting from performing a search. Search terms have been entered in search field 602 to conduct the search. The search term has been matched to various web site links 604 available from the Internet. The user may visit the electronic documents in the normal fashion.

Additionally, facts 610, 612, and 614 about the search term are displayed in section 608. Accordingly, a user can quickly spot facts about the subject of the search without having to visit any of the electronic documents that have been found and without having to manually read and discern fact from opinion. In this particular example, the facts 610, 612, and 614 include hyperlinks that the user may select to give more information about the source of the fact and/or to show the context within which the facts were discovered (e.g., date of the fact associated, other facts, etc.).

It will be appreciated that screenshot 600 is merely one example of how the facts may be presented to the user. Rather than presenting them in a separate column as shown, they may be listed as sub-elements of the electronic document that they have been extracted from. Furthermore, as an alternative to or in addition to listing the facts on the search results page, the facts extracted from a particular electronic document may also be listed in a column or other location upon the user viewing the electronic document itself. Additionally, as an alternative to or in addition to separating the facts from the document for display, the facts may be highlighted within the electronic documents both in the list of documents 604 within the search results and within the complete electronic document when it is chosen for display. As yet another alternative, the facts may be displayed independently from search results, such as to display facts only with a selectable link to obtain the source documents, where only the extracted facts have been searched to thereby avoid the document search completely.

Additionally, it will be appreciated that the presentation of the extracted facts, such as that shown in screenshot 600, may be provided as a display to a local computer implementing the search and fact extraction for a local user. Alternatively, the presentation of the extracted facts, such as that shown in screenshot 600, may be provided as a display to a remote computer that has requested that the local computer perform the search and fact extraction on its behalf, such as in the case of an Internet based search engine.

Accordingly, facts may be efficiently and accurately extracted from documents for presentation to users. Through the multi-stage approach, the efficiency is increased by avoiding detailed analysis of the entire documents as well as avoiding detailed analysis of the entire sentence where a factual description has been found. The accuracy is maintained by employing further analysis upon the factual descriptions that have been discovered in the document by the initial stage of processing.

While the invention has been particularly shown and described with reference to various embodiments thereof, it will be understood by those skilled in the art that various other changes in the form and details may be made therein without departing from the spirit and scope of the invention. For example, certain exclusion rules that are not specific to the linguistic constituents of a factual description, such as those based on punctuation of a sentence, may be applied when parsing for the factual description rather than later during the application of other exclusion rules.

APPENDIX A

| Fact Words |
| --- |
| abase |
| abate |
| abort |
| abrade |
| abridge |
| absorb |
| abstract |
| accelerate |
| accent |
| accept |
| accredit |
| achieve |
| act |
| add |
| address |
| adduce |
| adjust |
| administer |
| admit |
| advance |
| advertise |
| aerate |
| afford |
| aggravate |
| agree |
| aid |
| aim |
| air |

APPENDIX A-continued

Fact Words allay
alleviate
alter
amend
amplify
amuse
animate
announce
answer
antedate
appear
appease
apply
argue
arouse
arrange
arrest
arrive
ask
assemble
assert
asseverate
assign
assuage
assure
attach
attack
attenuate
avert
avoid
awake
award
back
bail
bank
bar
barbarize
bare
base
batter
beach
beam
bear
become
befog
befuddle
beget
begin
begrime
belch
belie
bend
benumb
bequeath
bestow
betray
better
bind
blackleg
blanket
bleach
blemish
blend
blight
blister
block
blockade
blow
blunder
blunt
blur
blurt
bob
bog
boil
bolster
boost

APPENDIX A-continued

Fact Words bowdlerize
bowl
brace
brand
brave
break
brief
brighten
bring
broadcast
bruise
buckle
build
bull
bunch
bundle
bung
burlesque
burn
burst
bury
buy
bypass
canvass
cap
capitalize
carry
cast
castigate
castrate
catch
chafe
change
channel
charge
check
chill
chime
chip
chock
choke
choose
churn
cipher
circulate
circumvent
claim
clash
clean
cleanse
clear
climb
clinch
clip
clog
close
clot
cloud
cockle
coin
collapse
collect
colour
comfort
commission
commit
communicate
compare
complete
compound
compress
compromise
conceal
concede
conceive
conciliate
conclude

APPENDIX A-continued

Fact Words conduct
confess
confide
confirm
confound
confuse
congeal
connect
conserve
consolidate
constitute
constrain
constrict
continue
contort
contract
control
convert
convey
cook
cool
cordon
correct
corrode
corrupt
counter
countersink
cover
crack
crank
crash
craze
create
cripple
crop
cross
crumble
crush
cry
curb
curdle
curtail
cushion
cut
damage
damp
dance
dangle
darken
darn
dash
deaden
deal
debase
debauch
debunk
decay
decide
declare
deepen
deface
defeat
defend
deflate
deflect
deform
defrost
delay
delegate
deliver
demise
demonstrate
dent
deny
deplete
depreciate
depress

APPENDIX A-continued

Fact Words deprive
depute
derange
describe
desecrate
design
designate
desolate
despoil
destroy
detail
detect
deteriorate
determine
develop
die
differentiate
diffuse
dilute
dim
diminish
direct
dirty
disable
disappear
discharge
discipline
disclose
discolour
disconnect
discontinue
discover
discuss
disfigure
disguise
dislocate
dislodge
dismantle
dismount
disorder
dispatch
dispense
disperse
display
dispute
disrupt
distil
distinguish
distort
disturb
divert
divide
dock
doctor
dodge
double
douse
draft
dramatize
draw
dredge
dress
drive
drop
drown
duff
dull
earth
ease
eat
educate
effect
elevate
elicit
elude
emancipate
embellish

APPENDIX A-continued

Fact Words embitter
embody
emit
emphasize
enable
encourage
end
endorse
endow
enforce
engage
enhance
enjoin
enlarge
enliven
ennoble
enrich
enrol
enshrine
entail
entangle
enthrone
entrust
enunciate
epitomize
equalize
erect
escalate
establish
evade
evaporate
evince
evoke
exacerbate
exact
exaggerate
examine
exasperate
exceed
excite
exhale
exhibit
exist
expand
expedite
explain
expose
expound
express
extend
extinguish
extort
extract
fabricate
face
fade
fail
fake
fall
falsify
familiarize
fasten
father
fatten
feature
feed
ferry
fertilize
festoon
fiddle
fight
fill
filter
finalize
find
finish
fire

APPENDIX A-continued

Fact Words fit
fix
flag
flash
flaunt
flay
float
flood
floodlight
flourish
flush
fly
fog
foil
fold
follow
force
forge
forgive
form
foster
foul
found
frame
fray
free
freeze
frustrate
furl
furnish
furrow
fuse
gain
gallop
garble
gash
generate
gerrymander
get
give
gladden
glorify
gloss
glut
go
govern
grade
graduate
grant
grate
graze
ground
group
grow
guide
halt
halve
hamper
handle
happen
harass
harbour
harden
harm
harmonize
harry
hasten
hatch
head
heal
hear
heat
heighten
help
hide
hit
hoard

APPENDIX A-continued

Fact Words hoist
hold
hope
hound
hurt
identify
illuminate
imagine
impair
impart
impeach
impede
imperil
implant
improve
inaugurate
increase
indent
indenture
indicate
induce
induct
infect
infiltrate
infix
inflame
inflate
inflict
influence
inform
infuse
initial
initiate
injure
insert
inspire
instigate
instil
institute
integrate
intend
intensify
interpolate
interrupt
intimate
introduce
invert
invigorate
invite
invoke
involve
issue
jab
jam
jettison
jingle
join
jumble
jump
justify
keep
kick
kill
kindle
knock
lacerate
ladder
lance
land
laugh
launch
lay
layer
lead
leave
lend
lengthen

APPENDIX A-continued

Fact Words lessen
let
level
liberate
lie
light
lighten
limit
line
link
listen
litter
live
liven
load
lock
loose
loosen
lose
lower
lump
magnify
maintain
make
manage
mangle
manipulate
manufacture
mark
marshal
mask
match
matter
maul
measure
meet
mellow
melt
mend
mention
mildew
mind
misrepresent
miss
mist
mitigate
modify
mollify
moot
mould
move
muddle
muddy
muffle
muss
muster
mute
mutilate
narrow
navigate
neaten
nick
nip
notch
notice
nourish
nurse
obfuscate
obscure
obstruct
obtain
occupy
occur
offend
offer
open
operate

APPENDIX A-continued

Fact Words oppose
order
originate
outline
overcharge
overdo
overflow
overturn
overwork
pacify
pack
pad
panic
paralyze
pare
parlay
parole
parry
part
partition
pass
patch
pay
peal
peddle
peg
penalize
perform
perish
persecute
pervert
phrase
pick
pillow
pique
pit
placard
place
plan
plant
play
pluck
plug
plunge
point
poison
pole
polish
poll
pool
pop
pose
position
post
pound
preach
precipitate
predate
prefer
prejudice
preoccupy
prepare
present
preserve
prettify
prevent
prick
prime
proclaim
procure
produce
profess
programme
promote
promulgate
prop
propagandize

APPENDIX A-continued

Fact Words propel
propound
prosecute
protect
protest
prove
provide
provoke
prune
publicize
publish
pull
pulp
punch
puncture
punish
punt
purge
push
put
qualify
quarter
quench
question
quicken
quieten
quilt
race
raise
ransack
rap
rationalize
rattle
re-engage
re-establish
re-form
read
rear
reawaken
recall
receive
reclaim
recline
recognize
recommend
reconcile
reconsider
record
recruit
reduce
refer
refine
reflect
refloat
reform
refuse
regard
register
regulate
rehabilitate
rehearse
reinforce
reissue
reject
rekindle
relate
relax
release
relieve
reline
remould
remove
rend
renew
renovate
reopen
repair

APPENDIX A-continued

Fact Words replace
report
republish
require
rerun
reseat
resist
rest
restart
restore
restrain
result
resurrect
retail
retain
retire
retract
retrench
retrieve
return
reveal
reverse
revive
rewind
right
ring
rise
roast
rock
roll
rotate
rouse
row
ruffle
ruin
rumple
run
rush
rustle
sail
salvage
sap
save
scald
scorch
score
scotch
scratch
scream
scuff
scupper
scuttle
seal
sear
seat
secure
see
sell
send
serve
set
settle
sever
shake
shame
sharpen
shatter
sheathe
shed
shelter
shield
shift
shine
shingle
shirk
shoot
shorten

APPENDIX A-continued

Fact Words shout
show
shrink
shut
sift
sign
signal
signalize
signify
simmer
sing
singe
sink
sit
site
situate
skirt
slacken
slake
slash
sleep
slice
slip
slow
smear
smile
smudge
snag
snap
snarl
snuff
sober
soften
soil
solace
solidify
soothe
sort
sound
sour
sow
spare
spark
speak
speck
speed
spill
spin
splinter
split
splodge
spoil
sponsor
sport
spot
spout
sprain
spray
spread
spring
square
squash
squeeze
stack
staff
stain
stalemate
stall
stamp
stand
star
starch
start
staunch
stay
steady
steer

APPENDIX A-continued

Fact Words

| | |
|---|---|
| stem | trap |
| step | travel |
| stick | treat |
| stiffen | trigger |
| still | trim |
| stir | truss |
| stoke | try |
| stop | tumble |
| store | turn |
| straighten | twang |
| strain | twiddle |
| strand | twirl |
| strengthen | twist |
| stress | unblock |
| stretch | unburden |
| strike | unclog |
| strip | undo |
| strum | unfasten |
| study | unfix |
| stuff | unfold |
| stultify | unhinge |
| stunt | unhitch |
| subdue | unite |
| subscribe | unloose |
| subvert | unravel |
| succeed | unsaddle |
| suffer | unseat |
| suggest | unsex |
| suit | unstop |
| summarize | untangle |
| supplement | untwist |
| supply | uphold |
| support | upset |
| suppose | urge |
| suppress | use |
| surface | validate |
| surrender | vandalize |
| survive | veer |
| suspend | veil |
| sustain | ventilate |
| sweep | vocalize |
| sweeten | voice |
| swell | vote |
| swing | vulgarize |
| swish | waft |
| taint | waggle |
| tarnish | wake |
| task | walk |
| teach | wangle |
| tear | warm |
| telephone | warn |
| temper | warp |
| tend | warrant |
| thank | wash |
| thaw | watch |
| thin | weaken |
| thrill | wean |
| throw | wear |
| thrust | weave |
| thump | weep |
| thwart | weld |
| tidy | whet |
| tighten | whirl |
| toll | whitewash |
| tootle | widen |
| topple | wield |
| torment | wiggle |
| torture | wilt |
| total | win |
| touch | wind |
| toughen | wing |
| tousle | wipe |
| tow | wire |
| train | wish |
| trample | withdraw |
| transfer | wither |
| transplant | withhold |

APPENDIX A-continued

Fact Words work
worry
wreak
wreck
wrest
wring
wrinkle
write
yield

What is claimed is:

1. A computer-implemented method performed by a processor for distinguishing facts from opinions within electronic resources, comprising:

receiving a search term comprising a noun;

finding relevant electronic resources that match the search term;

displaying a list of relevant electronic resources and snippets of the relevant electronic resources in the list that comprise words matching the search term;

scanning a relevant electronic resource to discover factual descriptions of sentences that comprise the noun of the search term and one or more verbs matching words of a fact-word table constructed to include a list of verbs determined to be indicative of fact expressions;

eliminating portions of the relevant electronic resource from fact extraction processing that comprise words not matching the search term and the words of the fact-word table;

examining the discovered factual descriptions to identify the linguistic constituents of the factual descriptions after eliminating portions of the relevant electronic resource;

determining whether to present a factual description as a fact based on the identified linguistic constituents; and presenting at least a portion of a sentence that contains the search term and a factual description determined to be a fact relevant to the search term.

2. The method of claim 1, wherein determining whether to present a factual description as fact based on the identified linguistic constituent comprises:

applying excluding rules in relation to the linguistic constituents of the factual descriptions to eliminate certain factual descriptions from consideration;

scoring the factual descriptions;

comparing the score of each factual description remaining for consideration to a threshold; and for each factual description having a score that exceeds the threshold, presenting at least a portion of the sentence containing the factual description as a fact.

3. The method of claim 2, further comprising tagging words of the factual descriptions with their parts of speech.

4. The method of claim 3, wherein tagging words of the factual descriptions with their parts of speech comprises applying a noun tag when a word may be either a verb or a noun.

5. The method of claim 4, wherein applying the excluding rules comprises applying a first set of rules for syntactic phrases that have a role of subjects and applying a second set of rules for syntactic phrases that have a role of objects.

6. The method of claim 5, wherein applying the first set of rules comprises excluding noun phrases having an opinion or biased modifier of subjects or objects.

7. The method of claim 5, wherein applying the second set of rules comprises excluding subject noun phrases which contain non-proper name definite descriptions, excluding noun phrases which contain pronouns, and excluding subject noun phrases which do not appear at the beginning of text.

8. The method of claim 5, further comprising applying a third set of rules without regard to the role of the noun phrase.

9. The method of claim 8, wherein applying the third set of rules comprises excluding factual descriptions where the punctuation of the sentence is a question mark, and excluding sentences with phrases that include a stop word.

10. The method of claim 2, wherein scoring the factual descriptions comprises scoring only those factual descriptions remaining for consideration either after or during application of the excluding rules.

11. A computer readable storage medium containing executable program instructions that, when executed by a processor, cause the processor to perform acts comprising:

receiving a search term comprising a noun;

finding relevant electronic resources that match the search term;

displaying a list of relevant electronic resources and snippets of the relevant electronic resources in the list that comprise words matching the search term;

parsing a plurality of relevant electronic documents to discover factual descriptions of sentences that comprise the noun of the search term and one or more verbs matching words of a fact-word table constructed to include a list of verbs determined to be indicative of fact expressions;

eliminating portions of the relevant electronic documents from fact extraction processing that comprise words not matching the search term and words of the fact-word table;

examining the discovered factual descriptions to identify the linguistic constituents of the factual descriptions after eliminating portions of the electronic documents;

determining whether to present a factual description as a fact relevant to the search term based on the identified linguistic constituent by applying excluding rules to candidate factual descriptions in relation to the linguistic constituents, scoring candidate factual descriptions based on certainty of a matching fact-word and on individual weights of subject and object noun phrases, and eliminating candidate factual descriptions from consideration according to the excluding rules and scoring of the factual descriptions; and presenting at least a portion of a sentence that contains the search term and a factual description determined to be a fact relevant to the search term.

12. The computer readable storage medium of claim 11, wherein the acts further comprise obtaining the plurality of documents by searching an collection of electronic documents to find those documents containing the search term, wherein the collection is searched to find those documents containing the search term prior to parsing the plurality of electronic documents.

13. The computer readable storage medium of claim 11, wherein the acts further comprise obtaining the electronic documents and presenting factual descriptions prior to receiving the search term and searching the electronic documents and factual descriptions to find those electronic documents and corresponding factual descriptions that are relevant to the search term.

14. The computer readable storage medium of claim 11, wherein the acts further comprise:

comparing the score of each factual description remaining for consideration to a threshold; and for each factual description that is taken from an electronic document that contains the search term and that has a score that exceeds the threshold, presenting at least a portion of the sentence containing the factual description as a fact relevant to the search term.

15. The computer readable storage medium of claim 14, wherein scoring the factual descriptions comprises scoring only those factual descriptions remaining for consideration after applying the excluding rules.

16. A computer system, comprising:
storage containing a plurality of electronic resources that comprise textual information;
a processor that receives a search term comprising a noun, finds relevant electronic resources that match the search term, displays a list of relevant electronic resources and snippets of the relevant electronic resources in the list that comprise words matching the search term, and receives a request to present facts that are related to the search term from a set of relevant electronic documents, wherein the processor parses the relevant electronic documents to discover factual descriptions of sentences that comprise the noun of the search term and one or more verbs matching words of a fact-word table constructed to include a list of verbs determined to be indicative of fact expressions, the processor eliminates portions of the relevant electronic documents from fact extraction processing that comprise words not matching the search term and words of the fact-word table, the processor examines the discovered factual descriptions to identify the linguistic constituents of the factual descriptions after eliminating portions of the relevant electronic documents, determines whether to present a factual description as a fact based on the identified linguistic constituent, and presents at least a portion of sentences that contain the factual descriptions that are determined to be presented as a fact and that are related to the search term.

17. The computer system of claim 16, further comprising a display device and wherein the processor presents at least the portion of the sentences by displaying at least the portions of the sentences on the display device.

18. The computer system of claim 16, further comprising a network interface and wherein the processor presents at least the portion of the sentences by outputting those portions to another computer via the network interface.

19. The computer system of claim 16, further comprising a network interface and wherein the storage is accessible by the processor via the network interface.

20. The computer system of claim 16, wherein the processor determines whether to present a factual description as fact by:
applying excluding rules in relation to the linguistic constituents of the factual descriptions to eliminate a portion of the factual descriptions from consideration;
scoring the factual descriptions;
comparing the score of each factual description remaining for consideration to a threshold; and
for each factual description that contains the search term and that has a score that exceeds the threshold, presenting at least the portion of the sentence containing the factual description as a fact relevant to the search term.

* * * * *